Patented July 26, 1932

1,868,646

UNITED STATES PATENT OFFICE

BENJAMIN F. WALLACE, OF BROOKLYN, NEW YORK

FOUNDRY FACING

No Drawing. Application filed August 13, 1929, Serial No. 385,693. Renewed January 16, 1932.

This invention relates to a facing compound for use in casting metal in said molds and has for its particular objects the provision of a so-called slicking lead which is unusually free from inert or inactive materials having little or no peeling value and which contains a very high percentage of carbon and organic material having a peeling action on the mold. Furthermore, the material has excellent working qualities which greatly facilitate the application of the same to the walls of a mold by means of slicking tools and by manual rubbing thereon.

Heretofore in the production of slicking leads for sand molds, it has been customary to employ a mixture of either amorphous or flake graphite with clay and talc, the two latter ingredients being present in the mixture in large proportions, often running from 30% to 40% by weight thereof. The clay and talc (soapstone ingredients) while serving as a bond to cause the adhesion of the graphite to the surfaces of the mold, since the graphite alone will not adhere to the sand surfaces but will curl up under the action of the slicking tool, had in themselves no peeling action and therefore, insofar as any peeling effect of the mixture is concerned, the same was entirely due to the graphite ingredients. Furthermore, such inorganic binders as clay and talc tend to render the mixture tacky or sticky and layers would become so wet due to the tendency of these ingredients to draw water from the green sand surface that it was impossible to apply several layers of the material where because of the nature of the casting, a thick facing layer was required and consequently not only were such prior slicking leads relatively ineffective, due to the adulterants therein, but they were ill-adapted for use in the production of large heavy castings where a thick heat insulation layer is necessary in order to obtain high class castings, since the presence of colloidal water-absorbents, such as the clay and talc ingredients, tended to cause the facing or slicking lead to abstract water from the green sand surface of the mold and to excessively wet the superficial coating so applied which prevented the effective slicking of the mold with the slicking tool due to the tendency of the facing to curl up under the action of the tool during the slicking operation and thereby the proper glazing of the same to smooth out the irregularities in the mold surface and to obtain a glaze-like finish to the casting has been virtually impossible.

My improved product possesses all the desirable features of the slicking leads heretofore employed and in addition thereto, because of its freedom from inorganic binders, particularly clay and talc, which have no peeling action on the casting as aforesaid, it is especially adapted, because of its remarkable peeling action, for the production of all types of casting, even including heavy castings.

In carrying out my invention, I preferably proceed as follows:—

200 parts of carbon, preferably in the form of mixture of amorphous graphite ⅓, flake graphite ⅓ and ⅓ artificially produced carbon, such as gas carbon, are mixed with 23 parts of a gum tragacanth-glycerine solution, this solution being prepared by first dissolving to a clear solution one part of tragacanth in 20 parts of water and then adding to such solution 2 parts of glycerine. The mixing operation is practically accomplished by spraying the carbon ingredients with the gum tragacanth-glycerine solution immediately after the latter is introduced into the drying machine and while constantly agitating the mixture therein, but preferably before applying heat to the mixture.

The damp mass resulting from this latter mixing operation is then introduced into a dryer equipped preferably with agitators to prevent the clumping of the mass during the drying operation and therein is subjected to an elevated temperature, about 220° to 240° F. The product resulting from the aforesaid operations is finally ground in a suitable mill to a fineness of about 200 mesh.

While I prefer to employ glycerine, I may substitute therefore an equal quantity of mineral oil, such for example as lubricating oil, and in such an event the tragacanth is first dissolved in the water and the aqueous solution is then sprayed on the carbon in the manner above described. The mixture is then introduced into the dryer and during the drying operation the oil is sprayed into the mass.

In lieu of tragacanth gum I may employ other gums and binders as for example, gum arabic or dextrine or sugar, but because of the excellent working qualities imparted by the gum tragacanth to my improved product, I much prefer to employ the same.

The employment of amorphous, lusterless, non-unctuous or non-slippery, artificially prepared carbons, which in themselves are wholly unsuited for use as slicking leads, enables me to secure an unusual peeling action, which is impossible to obtain with ordinary graphite slicking leads heretofore used, all without impairing the working qualities of the mixture. Furthermore, since the glycerine itself has a recognized peeling value, my improved product contains essentially 99½% of ingredients which have a distinct peeling action in the casting as distinguished from the present slicking leads which seldom contain over 70% of ingredients that have any peeling action whatsoever.

In lieu of gas carbon, I may employ lamp black, a decomposition product obtained from the incomplete combustion of hydrocarbon oils, but gas carbons, such as retort carbon, obtained in the manufacture of illuminating gas, or carbon black, obtained from the decomposition of natural gas, are preferable. All of these carbons are amorphous, difficultly combustible, lusterless, relatively non-slippery and non-unctuous and, in this sense, non-graphitic while being relatively more combustible than the natural or artificial graphites which are crystalline, have a metallic lustre, are unctuous or slippery and are extremely refractory when exposed to a flame.

My improved product is particularly adapted for use where successive applications of a plurality of layers of the material are desired in order to produce a thick skin-coat, such for example as are highly desirable in the production of thick, heavy castings, as there is no tendency for the facing material to draw water from the mold and to become excessively wet as would occur were substantial amounts of colloidal water-absorbents such as clay and talc present, with a consequence that there is no tendency for the coating to curl under the action of the slicking tool and therefore a smooth, glaze-like finish can be applied to the mold surface and imparted to the castings obtained from the casting operation therein.

My improved slicking lead is extremely unctuous and possesses almost ideal working qualities under the tool, being neither tacky, nor sticky and each layer applied has an affinity for subsequently applied layers thereof to such an extent that as many as six layers can, if desired, be conveniently applied to the surfaces of the green sand mold without the same tending to curl up under the action of the slicking tool. Moreover, the characteristics of my improved slicking lead are such that the steam generated in the casting operation can readily penetrate through the coating and the mold, while the molten metal will flow over the relatively or apparently dry skin surface of the mold without having any tendency to destroy or erode beads, cams or other projections on the mold surface.

The term "non-graphitic", used in the claims, has reference to amorphous, lusterless, non-unctuous products which are difficultly combustible and quite refractory, but less so than the natural graphites or their prototype artificial graphite made in an electric furnace.

The term "gas carbon" is used herein in its broadest significance to include carbon obtained from the decomposition of gas, whether carbon black, the product produced by the decomposition of natural gas or the aforesaid amorphous, lusterless form of carbon known as a retort carbon which is obtained from the retorts used in the manufacture of illuminating gas.

Various other ingredients than those herein specified capable of functioning the same and which are embraced within the scope of the appended claims and various modifications in the method of making the product from that herein described may be employed without departing from the spirit of my invention.

Having thus described my invention, what I claim and desire to obtain by United States Letters Patent is:

1. A slicking compound for facing green sand molds for casting metal, comprising a dry mixture of a refractory, difficultly oxidizable graphite, a substantially non-graphitic, lusterless carbon formed by the decomposition of gaseous hydrocarbons, the amount of the carbon ingredients substantially exceeding 10% each and a small amount, not exceeding 10% of a binder.

2. A slicking compound for facing molds for casting metal, comprising a dry mixture of a plurality of difficultly oxidizable graphitic carbons, a substantially non-graphitic, lusterless, artificially prepared carbon and an organic binder, the amount of the latter being relatively small, not exceeding 6% and the amount of the carbon ingredients substantially exceeding 10% each.

3. A slicking compound for facing molds for casting metal, comprising a dry mixture of amorphous graphite and flake graphite, a substantially non-graphitic, lusterless carbon and an organic binder, the amount of the latter being relatively small, not exceeding 6% and the amount of the carbon ingredients substantially exceeding 20% each.

4. A slicking compound for facing molds for casting metal, comprising a dry mixture of a refractory difficultly oxidizable graphitic carbon, a substantially non-graphitic, lusterless, artificial carbon and an organic binder, the amount of the latter being relatively small, not exceeding 3% and the amount of the carbon ingredients substantially exceeding 25% each.

5. A slicking compound for facing molds, comprising a dry mixture of graphite, a relatively combustible, lusterless carbon resulting from the decomposition of hydrocarbons and an organic binder, the graphite and combustible carbon ingredients being each present in an amount in excess of 25% and the organic binder being present in a relatively small amount, less than 10%.

6. A slicking compound for facing molds, comprising a dry mixture of graphite, a relatively combustible carbon resulting from the decomposition of gaseous hydrocarbons and a water soluble organic binder and glycerine, the graphite and combustible carbon ingredients being each present in an amount in excess of 25% and the organic binder being present in a relatively small amount, less than 6%.

7. A slicking compound for facing sand molds for casting metal, comprising a dry mixture of amorphous graphite, flake graphite and a substantially non-graphitic relatively combustible, lusterless carbon resulting from the decomposition of gaseous hydrocarbons, the graphitic and non-graphitic carbon ingredients being present in relatively large amounts, exceeding 20% each, and said mixture containing a small amount of gum tragacanth and a small amount of glycerine, each of the two latter ingredients being present in an amount not exceeding 5% each.

8. A slicking compound for facing sand molds for casting metal, comprising a dry mixture of amorphous graphite, flake graphite and a substantially non-graphitic relatively combustible, lusterless, artificial carbon, the graphite and combustible carbon ingredients being each present in an amount in excess of 25% and the organic binder being present in a relatively small amount, less than 10%.

Signed at New York, in the county of New York and State of New York, this 5th day of August, 1929.

BENJAMIN F. WALLACE.